United States Patent
Smith

(10) Patent No.: US 8,349,240 B2
(45) Date of Patent: Jan. 8, 2013

(54) HIDDEN PARTING LINE MOLD AND HIDDEN PARTING LINE MOLDING TECHNIQUE USING ASSOCIATED PART REMOVAL DEVICE

(75) Inventor: Patrick Smith, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 13/071,817

(22) Filed: Mar. 25, 2011

(65) Prior Publication Data

US 2012/0242004 A1 Sep. 27, 2012

(51) Int. Cl.
*B29C 45/42* (2006.01)
*B29C 45/44* (2006.01)

(52) U.S. Cl. ............... 264/318; 264/328.1; 264/334; 425/444; 425/556; 425/DIG. 58

(58) Field of Classification Search ............ 264/318, 264/328.1, 334; 425/444, 556, 577, DIG. 58
See application file for complete search history.

(56) References Cited

U.S. PATENT DOCUMENTS

| | | |
|---|---|---|
| 3,679,339 A | 7/1972 | Tucker |
| 3,865,529 A | 2/1975 | Guzzo |
| 4,136,150 A | 1/1979 | Darnall, Jr. |
| 4,327,051 A | 4/1982 | Edmondson |
| 4,531,704 A | 7/1985 | Matthei |
| 4,571,320 A | 2/1986 | Walker |
| 4,781,571 A | 11/1988 | Heindl et al. |
| 4,854,849 A | 8/1989 | Sudo |
| 4,889,480 A | 12/1989 | Nakamura et al. |
| 4,904,008 A | 2/1990 | Glance |
| 4,994,224 A | 2/1991 | Itoh et al. |
| 5,183,615 A | 2/1993 | Zushi |
| 5,234,329 A | 8/1993 | Vandenberg |
| 5,364,583 A | 11/1994 | Hayashi |
| 5,397,226 A | 3/1995 | Vandenberg |
| 5,527,173 A | 6/1996 | Miller et al. |
| 5,536,161 A | 7/1996 | Smith |
| 5,603,968 A | 2/1997 | Tajiri et al. |
| 5,674,446 A | 10/1997 | Hayashi et al. |

(Continued)

FOREIGN PATENT DOCUMENTS

CN 201333772 Y 10/2009

(Continued)

OTHER PUBLICATIONS

Electronic translation of JP 05-285999.*

*Primary Examiner* — Jill Heitbrink
(74) *Attorney, Agent, or Firm* — Standley Law Group LLP

(57) ABSTRACT

An injection mold and a cooperating molding system and method that allows for the parting line of a molded vehicle bumper fascia to be hidden within the wheel arch portion thereof. The invention contemplates two different mold designs for producing such a parting line: a double-lifter design and a collapsing slide core design. The bumper fascia remains in the cavity portion of the mold after molding due to the presence of undercuts in the mold cavity. A robotic part removal device is used to remove the molded bumper fascia from the mold cavity after mold opening. The part removal device is adapted to temporarily deform the bumper fascia in the wheel arch flange areas thereof to facilitate its removal from the cavity.

27 Claims, 4 Drawing Sheets

U.S. PATENT DOCUMENTS

| | | |
|---|---|---|
| 5,728,344 A | 3/1998 | Tajiri et al. |
| 5,766,655 A | 6/1998 | Tajiri et al. |
| 5,814,357 A | 9/1998 | Boskovic |
| 5,869,112 A | 2/1999 | Pierro |
| 5,895,621 A | 4/1999 | Tajiri et al. |
| 6,143,227 A | 11/2000 | Heiden et al. |
| 6,443,723 B1 | 9/2002 | Buttigieg |
| 6,485,285 B1 | 11/2002 | Shiotani |
| 7,104,774 B2 | 9/2006 | Buttigieg |
| 7,125,244 B2 | 10/2006 | Ha et al. |
| 7,175,421 B2 | 2/2007 | Takemoto et al. |
| 7,264,761 B2 | 9/2007 | Evans et al. |
| 7,276,200 B2 | 10/2007 | Jacob et al. |
| 7,632,447 B2 | 12/2009 | Swistak et al. |
| 2002/0033551 A1 | 3/2002 | Sorgel |
| 2004/0033286 A1 | 2/2004 | Vanderploeg et al. |
| 2006/0076714 A1 | 4/2006 | Swistak et al. |
| 2006/0220274 A1 | 10/2006 | Dooley et al. |
| 2008/0317899 A1 | 12/2008 | Volponi |

FOREIGN PATENT DOCUMENTS

| | | |
|---|---|---|
| CN | 101607435 A | 12/2009 |
| CN | 201366773 Y | 12/2009 |
| CN | 201405466 Y | 2/2010 |
| DE | 102008025082 B3 | 8/2009 |
| JP | 5-285999 * | 11/1993 |
| JP | 2007-136809 A | 6/2007 |
| JP | 2007-319960 A | 12/2007 |
| JP | 2007-320064 A | 12/2007 |
| JP | 2008-30283 A | 2/2008 |
| JP | 2008-142973 A | 6/2008 |
| JP | 2008-246717 A | 10/2008 |
| JP | 2009-226792 A | 10/2009 |
| JP | 2009-241541 A | 10/2009 |
| JP | 2009-292065 A | 12/2009 |
| JP | 2009-292132 A | 12/2009 |
| JP | 2010-5804 A | 1/2010 |
| JP | 2010-23260 A | 2/2010 |
| JP | 2010-36475 A | 2/2010 |
| JP | 2010-89389 A | 4/2010 |
| KR | 10-2008-0000722 A | 1/2008 |

* cited by examiner

HIDDEN PARTING LINE MOLD AND HIDDEN PARTING LINE MOLDING TECHNIQUE USING ASSOCIATED PART REMOVAL DEVICE

TECHNICAL FIELD

The present invention is directed to a mold, particularly a plastic injection mold, and an associated molding system and method for producing a molded part having a hidden parting line. The molded part may be a vehicle bumper fascia and the hidden parting line of interest may be located on a wheel arch flange portion thereof.

BACKGROUND

Molding is a commonly employed technique for producing parts of simple to complex geometry. Plastic molding techniques may include, for example, injection molding. Injection molding is a popular technique for producing large-scale parts, such as vehicle parts. One part of interest to the present invention is a vehicle bumper fascia.

As would be well understood by one of skill in the art, injection molding typically utilizes a mold that is divided into two mold halves—one half including a mold cavity and another including a mold core. One half of the mold is affixed to a stationary molding machine platen and the other half is affixed to a moving molding machine platen.

As would also be well understood by one of skill in the art, the mating faces of the mold halves create a parting line on the molded part. Even when the mating faces of the mold halves fit tightly together, it is typical that some indication (e.g., a raised line) of the parting line will appear on the molded part.

For at least aesthetic reasons, it is often desirable that the parting line of a given molded part be located along a part area that is not visible to an observer from a typical viewing angle. Placing a parting line in such a location may be desirable on a variety of different parts.

Without limitation, one such part and a part of particular interest in the present invention, is a vehicle bumper fascia. As would be well known to one of skill in the art, vehicle bumper fascias are commonly injection molded from various plastic materials (e.g., TPO). These bumper fascias have a forward or rearward facing surface whose length extends in a width direction along a corresponding front or rear portion of a vehicle, as well as wing sections that extend transversely in the length direction of the vehicle, typically to form a portion of the vehicle's wheel wells.

Such bumper fascias are typically formed using large injection molds having a moving mold half and a stationary mold half. One mold half includes a mold core and the opposite mold half includes a mold cavity, which cooperate when the mold is closed to form the molded bumper fascia. The largest of the parting lines associated with such a bumper fascia can typically be relegated to unseen upper and lower portions of the part. However, it has traditionally proven much more difficult to hide the parting lines created near the free ends of the fascia wings, normally along the area that forms the arch-shaped wheel well flange.

More particularly, the wing portions of the bumper typically terminate in substantially arch-shaped ends so as to form a portion of what is normally a like-shaped wheel well. These wheel well forming portions of a bumper fascia typically include a flange that extends transversely inward to facilitate attachment of the wing end portion of the bumper fascia to the vehicle body—commonly, via screws or other fasteners.

As one skilled in the art of molding would clearly understand, the inwardly extending flanges of the bumper fascia wheel well portions cannot be molded by a mold having only a typical cavity and stationary core, as creation of the flanges requires an undercut in the mold cavity that would subsequently prevent removal of the bumper fascia after molding. Consequently, as illustrated in FIG. 1, known molding techniques for creating such a bumper fascia include a mold 5 with a cavity portion 10, a stationary core portion 15, and outwardly moveable side cores 20 that mate with a corresponding section of the mold cavity to form the wheel arch flanges 25. After molding, these side cores 20 are moved outward to a degree that temporarily deforms the fascia wings and permits the wheel arch flanges to clear the mold cores as the bumper fascia is ejected therefrom.

This known molding technique and mold design adequately function to produce a bumper fascia with inwardly extending wheel arch flanges. However, as can be observed in FIG. 1, the resulting parting line 30 is located on an easily visible (e.g., "A") surface of the bumper fascia. Thus, even after painting, the parting line is likely to be noticeable.

It should be apparent from the above description that it would be desirable to provide a mold and molding technique that permits the parting line of a bumper fascia in the area of the wheel arch flanges to be moved to a less visible surface—preferably, onto the wheel arch flanges of the bumper fascia and into the wheel well of a vehicle onto which a bumper fascia has been installed. The present invention provides such a mold and molding technique.

SUMMARY OF THE GENERAL INVENTIVE CONCEPT

The present invention is directed to an injection mold and a cooperating molding system and method that allows for the wheel arch parting line of a molded vehicle bumper fascia to be located on the wheel arch flange portion thereof so as to be subsequently hidden when the bumper fascia is installed to a vehicle. The invention contemplates two different mold designs for producing such a parting line: a double-lifter design and a collapsing slide core design.

In the double-lifter embodiment, a bumper fascia mold is provided with two mold halves; one of the mold halves including a mold cavity and the other of the mold halves including a stationary (main) mold core. The core half of the mold also includes a double-lifter mechanism having pairs of straight lifters and angled lifters that are coupled to pairs of secondary mold cores. The secondary mold cores, in conjunction with the main mold core and an undercut section of the mold cavity, form the wheel arch flanges of the molded bumper fascia.

The lifters are located on the mold ejector plate or a similar moveable plate. At mold opening, the cavity and ejector plate move in tandem such that the lifters move their corresponding secondary cores forward. One core of each of the secondary mold core pairs also moves simultaneously inward while moving forward. This inward movement allows the wheel arch flanges of the molded bumper fascia to clear the secondary cores prior to full mold opening. Due to the undercuts therein, the molded fascia remains with the mold cavity prior to its intentional removal by robotic take-out means (as described below). As a result of this mold design, the parting line created by the secondary cores and the cavity occurs on the wheel arch flange, so as to be substantially out of sight when the bumper fascia is installed to a vehicle.

In a collapsing slide core embodiment of the present invention, a bumper fascia mold is provided with inboard, sliding secondary mold cores. This embodiment uses interior hydraulic or pneumatic cylinders to move (slide) the secondary mold cores inward along a linear path. In a similar manner to the first embodiment, the inward movement of the secondary cores allows the flanges of the molded bumper fascia to clear the secondary cores prior to full mold opening. Due to the undercuts therein, the molded fascia once again remains with the mold cavity prior to its intentional removal by robotic take-out means (as described below). As a result of this mold design, the parting line created by the core and cavity again occurs on the wheel arch flange of the bumper fascia, so as to be substantially out of sight when the bumper fascia is installed to a vehicle.

Regardless of whether the first or second mold embodiment is used, the present invention also includes a robotic part removal (take-out) device that is used to remove the molded bumper fascia from the mold cavity. The robotic take-out device includes an end effector with a number of vacuum-powered suction cups and/or other gripping devices. The gripping devices are used to grip a molded bumper fascia while the bumper fascia resides in the mold cavity. The end effector is adapted to clear the molded bumper fascia of the undercuts in the main mold cavity prior to removal of the fascia therefrom. For example, in one exemplary embodiment the end effector is capable of inward movement that allows the end effector to temporarily draw (deform) the at least the wheel arch portion of the bumper fascia wings inward. This inward and non-permanent deformation of the bumper fascia wings allows the bumper fascia to clear the undercuts in the mold cavity as the fascia is removed therefrom.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1A:
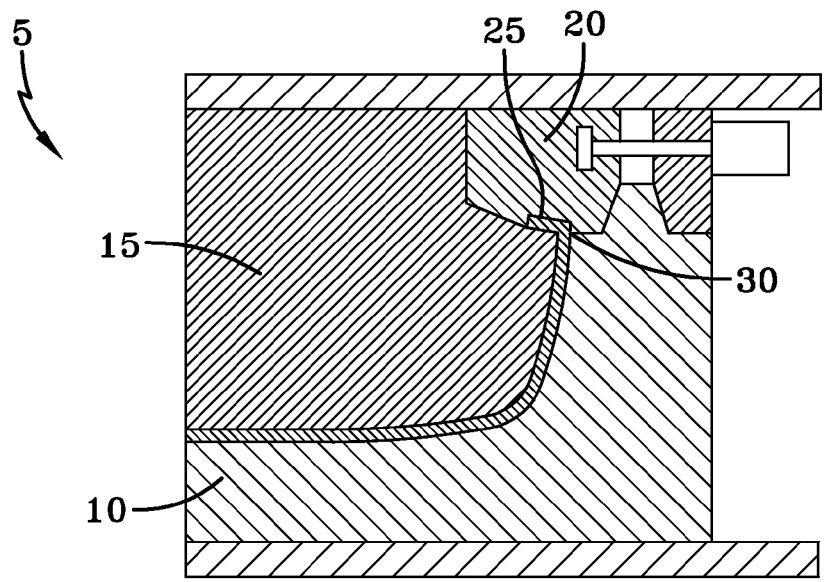
FIGS. 1A-1B illustrates a known bumper fascia mold design and molding technique that result in an undesirable wheel arch flange parting line location.
Figure 1B:
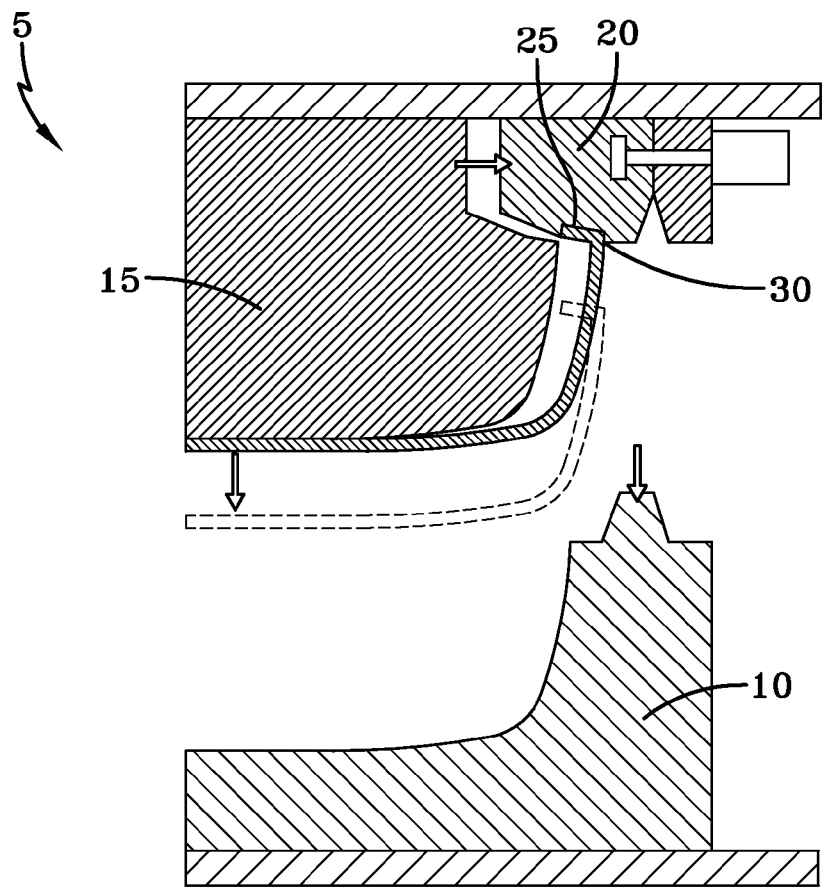
Figure 2A:
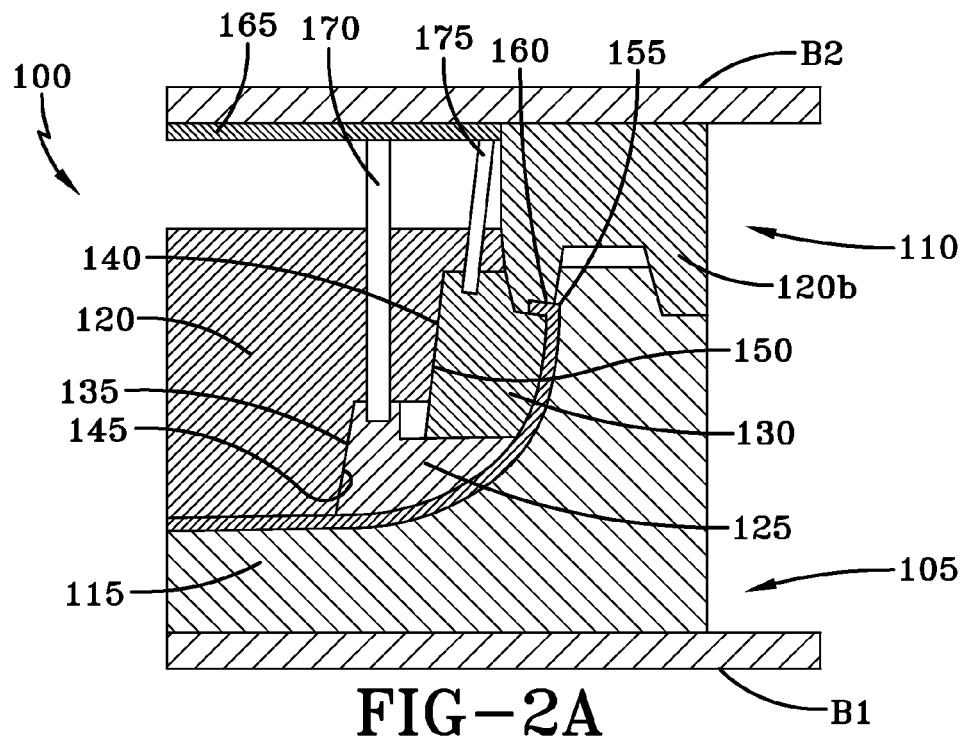
FIGS. 2A-2B schematically depict one exemplary embodiment of a bumper fascia mold of the present invention, the mold having a double lifter mechanism and collapsing secondary cores for use in creating a hidden parting line.
Figure 2B:
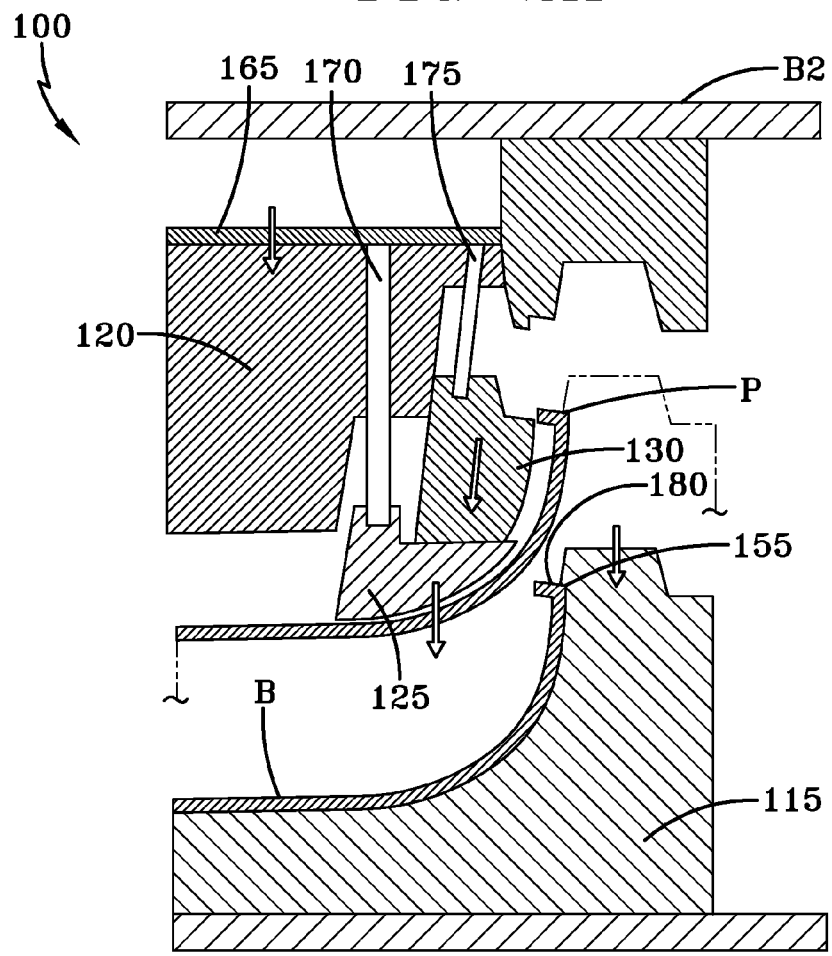

FIGS. 2A-2B schematically depict approximately one half of one exemplary embodiment of a double-lifter type bumper fascia injection mold 100 of the present invention, the non-visible half being a mirror image of the visible half. As shown, the mold 100 includes two mold halves 105, 110, one of which includes a mold cavity 115, and the other of which includes a primary mold core 120. Each mold half 105, 110 also includes a base (mounting) plate B1, B2 to which the cavity and core portions are attached and which are used to clamp the respective mold halves to the platens of an injection molding machine. In this particular embodiment, the mold cavity 115 is associated with the moving mold half 105 (i.e., the mold half that is clamped to the moving platen of an injection molding machine), but the cavity could also be located in the stationary mold half 110 (i.e., the mold half that is clamped to the stationary platen of an injection molding machine) in other embodiments.

The core half 110 of the mold also includes, at opposite ends thereof, pairs of secondary sliding/collapsing mold cores 125, 130 and associated connected lifters 170, 175 (only one pair shown). In this particular example, the secondary mold cores 125, 130 form the side (wing) portions of the bumper fascia, as well as the curved portions that transition the wing portions into the primary face of the fascia. As would be understood by one of skill in the art, the external surfaces of these secondary cores 125, 130 may have a variety of shapes so as to produce a molded bumper fascia of desired design.

As shown in FIGS. 2A-2B, an inner face 135, 140 of each of the secondary cores 125, 130 mates with a corresponding face 145, 150 located on the primary mold core 120. The mating faces 135, 140, 145, 150 of the secondary cores 125, 130 and the primary mold core 120 may be inwardly angled to facilitate their separation during secondary core movement. The angled relationship between the lower secondary core 130 and the corresponding mating face of the primary mold core 120 also serves another purpose, as described in more detail below.

As mentioned above, the secondary cores 125, 130 are independently connected to corresponding lifters 170, 175. The upper core 125 of each secondary core pair is connected to a straight lifter 170 that is operable to move the upper core 125 along a linear path directed substantially perpendicularly away from the base plate B2 of the core mold half 110. The lower core 130 of each secondary core pair is connected to an angled lifter 175 that is operable to move the lower core along a compound path, during which the lower core moves substantially perpendicularly away from the base plate B2 of the core mold half 110 while moving (collapsing) simultaneously inward toward the primary mold core 120. The angle of the angled lifter 175 is substantially the same as the angle of the mating faces 140, 150 between the lower secondary mold core 130 and the primary mold core 120.

The mating face 140 of the lower secondary core 130 may be slidably interlocked with the mating face 150 of the primary core 120 to help ensure proper inward movement of the lower secondary core. Such slidable interlocking may be accomplished by any of a variety of techniques that would be well known to one of skill in the art. Further, the mating faces 140, 150 of the lower secondary core 125 and the primary mold core 120 may be comprised of or coated with a low friction material to facilitate sliding therebetween. The mating faces 135, 145 between the upper secondary cores 125 and the primary mold core 120 may be similarly constructed.

The lifters 170, 175 are connected to an ejector plate 165 or a similar plate that is associated with the core mold half 110 and may be operated by the injection molding machine, as would be familiar to one of skill in the art. As shown in FIG. 2A, the ejector plate 165, lifters 170, 175, and secondary cores 125, 130 are retracted while the mold 100 is closed (e.g., during the injection or cooling phase of a molding cycle), such that the primary core 120 and secondary cores form a substantially unitary mold core.

It can be observed in FIGS. 2A-2B that the mold cavity 115 includes an undercut 155 that contributes to the formation of the wheel arch flange 180. The undercut 155 in the main mold cavity 120 and a flange forming cavity 160 in a corresponding outboard portion 120b of the primary mold core 120 cooperate to form an outer surface of the wheel arch flange 180, while the inner surface of the wheel arch flange is formed by the lower secondary core 130. The wheel arch flange parting line P is formed along the intersection of the undercut 155 and the outboard portion 120b of the primary mold core 120, such that the parting line occurs on the wheel arch flange 180, as shown. Thus, the parting line P is located so as to be largely out of sight when the bumper fascia B is installed to a vehicle.

Referring now to FIG. 2B, operation of the secondary cores 125, 130 may be observed. At mold opening, the cavity mold half 105 moves away from the core mold half 110 and the ejector plate 165 is actuated such that the lifters 170, 175 move their corresponding secondary cores simultaneously forward (and inward in the case of the lower secondary cores 130). The rate of movement of the ejector plate 165 and the secondary cores 125, 130 is timed to coincide with the rate of withdrawal of the cavity mold half 105 so there is no interference between the wheel arch flange 180 and the lower secondary cores 130. That is, the inward movement of the secondary cores 125, 130 is sufficient to allow the wheel arch flanges 180 of the molded bumper fascia B to clear the secondary cores prior to full mold opening. Due to the undercuts therein, the molded bumper fascia B is retained in the mold cavity 115 prior to its intentional removal by robotic take-out means (as described below).

Figure 3A:
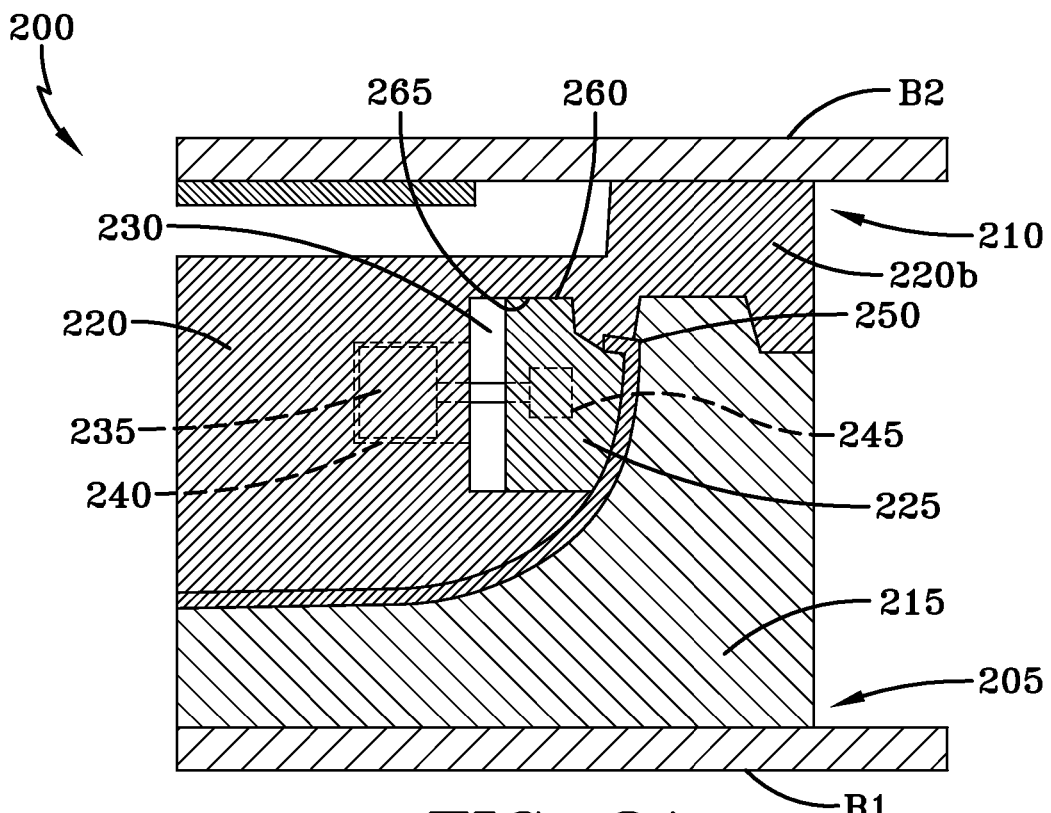
FIGS. 3A-3C schematically illustrate another exemplary embodiment of a bumper fascia mold of the present invention, the mold having collapsing secondary slide cores for use in creating a hidden parting line.
Figure 3B:
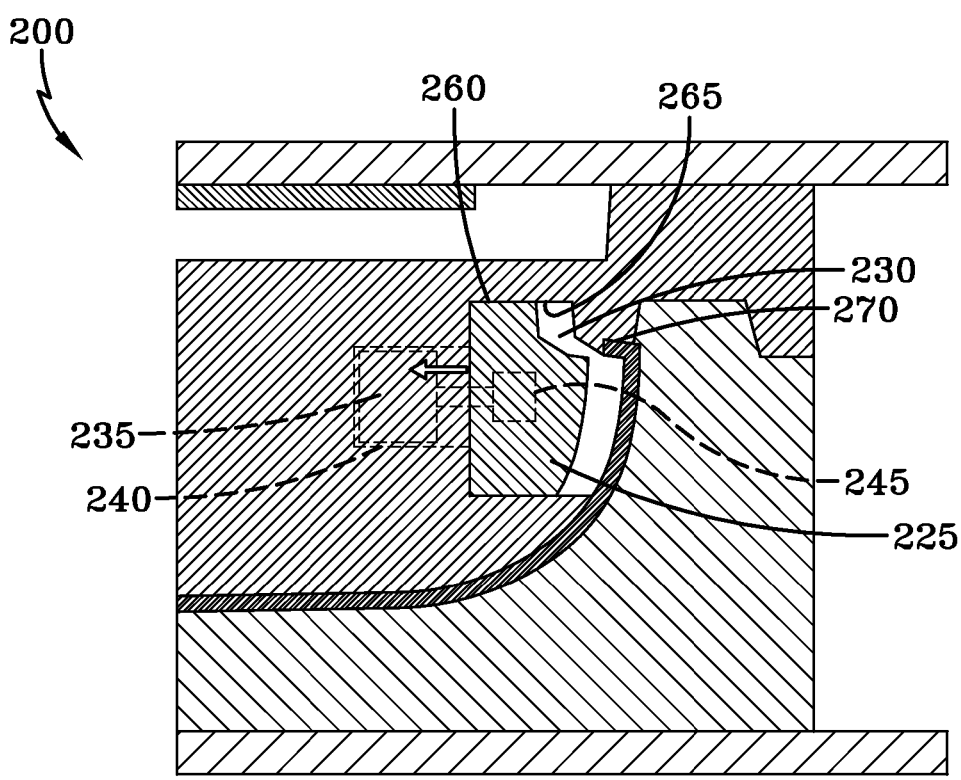
Figure 3C:
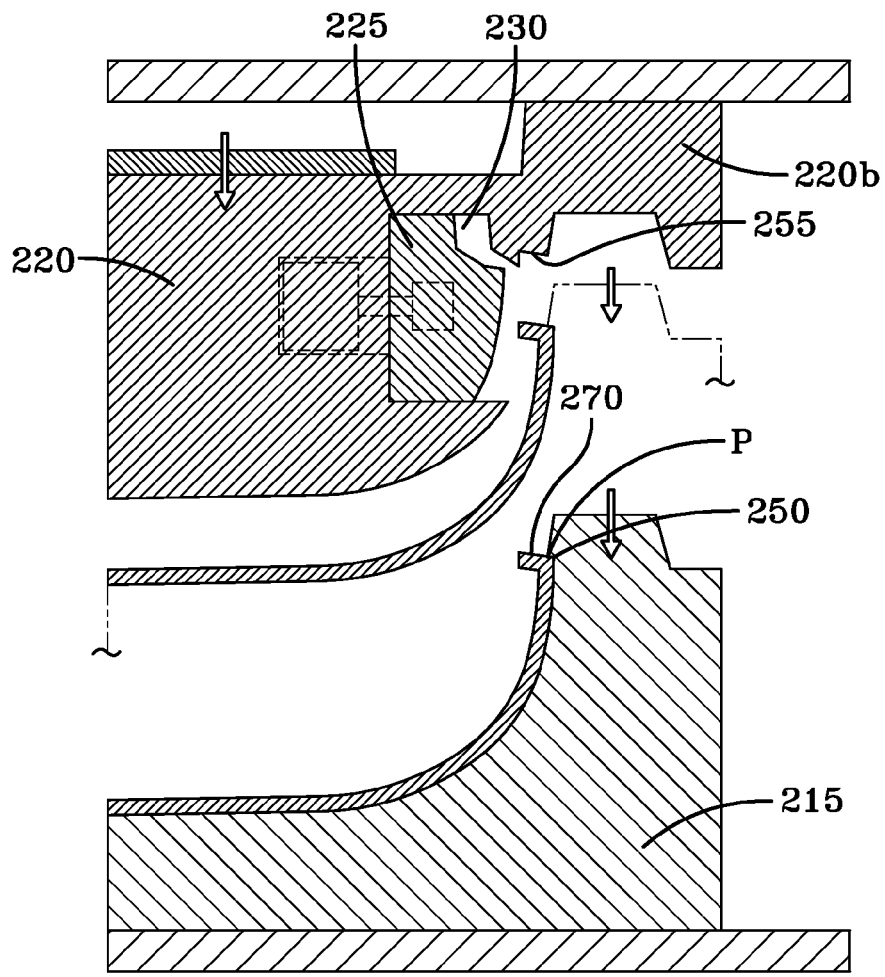

Approximately one half of a second exemplary embodiment of a bumper fascia mold 200 of the present invention is schematically depicted in FIGS. 3A-3C, the non-visible half being a mirror image of the visible half. This mold 200 uses a linearly collapsing slide core design to accomplish substantially the same wheel arch flange formation and parting line location as the mold 100 of FIGS. 2A-2B.

As with the mold 100 of FIGS. 2A-2B, the mold 200 includes two mold halves 205, 210, one of which includes a mold cavity 215, and the other of which includes a primary mold core 220. Each mold half 205, 210 also includes a base (mounting) plate B1, B2 to which the cavity and core portions are attached and which are used to clamp the respective mold halves to the platens of an injection molding machine. In this particular embodiment, the mold cavity 215 is again associated with the moving mold half 205, but the cavity could also be located in the stationary mold half 210 in other embodiments.

The core half 210 of the mold also includes, at opposite ends thereof, sliding secondary mold cores 225 (only one of which is shown). In this particular example, the secondary mold cores 225 form at least a portion of the side (wing) portions of the bumper fascia, as well as the wheel arch flange 270. As would be understood by one of skill in the art, the external surfaces of these secondary cores 225 may have a variety of shapes so as to produce a molded bumper fascia of desired design.

The sliding secondary cores 225 reside in and slide within cavities 230 in the primary mold core 220. Each secondary core 225 is coupled to an actuator 235, such as a hydraulic pneumatic cylinder, that is capable of producing a reciprocating linear movement thereof within the associated cavity 230. As shown, the actuator 235 is located inward of the secondary core 225 within a pocket 240 in the primary mold core 220.

A lower mating face 260 of each secondary core 225 may be slidably interlocked with a mating face 265 in the cavity 230 within which the secondary core travels to help guide the linear movement of the secondary cores. Such slidable interlocking may be accomplished by any of a variety of techniques that would be well known to one of skill in the art. Further, the mating faces 260, 265 of the secondary cores 225 and the associated mold core cavities 230 may be comprised of or coated with a low friction material to facilitate sliding therebetween.

Each secondary core 225 may also be provided with a slide lock 245 as shown. The slide lock 245 may be of various designs, but in any event, functions to lock the secondary core 225 in a given position. Generally, the secondary cores 225 will be locked in an extended position (see FIG. 3A) during injection and cooling phases of the molding cycle, and in a retracted position (see FIGS. 3B-3C) during mold opening and part removal phases of the molding cycle. The slide locks 245 may be actuated by a signal from the injection molding machine, and may be powered therefrom or separately.

It can be observed in FIGS. 3A-3C that the mold cavity 215 again includes an undercut 250 that contributes to the formation of the wheel arch flange 270. The undercut 250 in the main mold cavity 215 and a flange forming cavity 255 in a corresponding outboard portion 220b of the primary mold core 220 again cooperate to form an outer surface of the wheel arch flange 270, while the inner surface of the wheel arch flange is formed by the sliding secondary core 225. The wheel arch flange parting line P is formed along the intersection of the undercut 250 and the outboard portion 220b of the primary mold core 220, such that the parting line occurs on the wheel arch flange 270, as shown. Thus, the parting line P is located so as to be largely out of sight when the bumper fascia is installed to a vehicle.

Referring now to FIG. 3C, operation of the sliding secondary cores 225 may be understood. At mold opening, the cavity mold half 205 will move away from the core mold half 210, as previously described. Prior to such movement, the actuators 235 are energized to retract the secondary cores 225 away from the molded bumper fascia B and into the cavities 230 in the primary core 220. This pre-retraction of the secondary cores 225 permits the wheel arch flanges 270 of the molded bumper fascia B to clear the secondary cores during mold opening without any interference. Due to the undercuts 250 therein, the molded bumper fascia B is again retained in the mold cavity 215 prior to its intentional removal by robotic take-out means (as described below).

Figure 4:
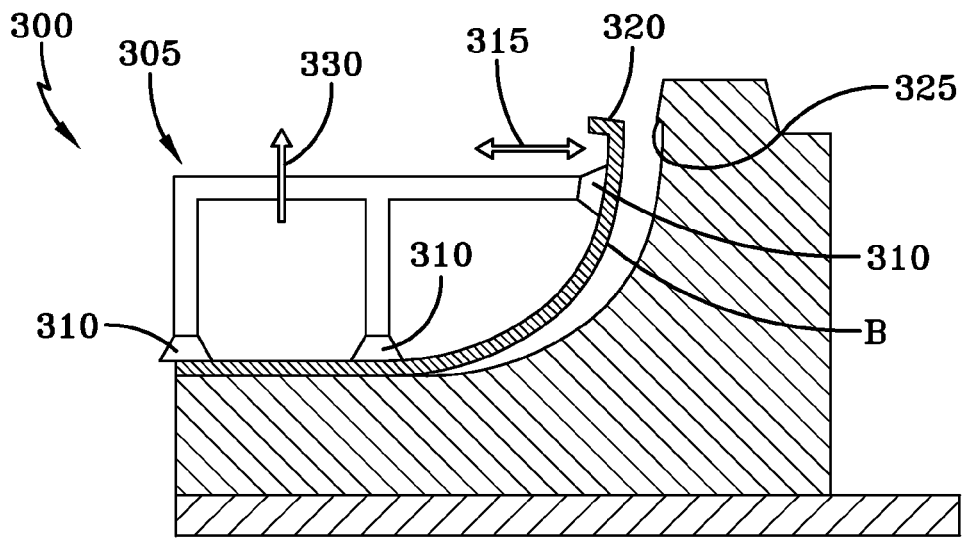
FIG. 4 schematically illustrates one exemplary embodiment of a robotic part removal device that is used to remove molded bumper fascias from the mold cavities of the molds of FIGS. 2A-3C after molding is complete.

As represented in FIG. 4, regardless of whether the first or second mold embodiment is used, the present invention also includes an automated (e.g., robotic) part removal device 300 that is used to remove the molded bumper fascia B from the mold cavity of the mold after mold opening. The part removal device may be of various general designs, such as a gantry design wherein the device resides primarily above or alongside the injection machine and includes an extendable arm (not shown) that reaches into the molding machine during a part removal phase of the molding cycle.

Whatever the general design of the part removal device 300, the device includes an end effector 305 (only half of which is shown) with a number of gripping devices that are operable to grip a molded bumper fascia B while the bumper fascia is retained in the cavity of the mold. In this particular exemplary embodiment, the end effector is equipped with a number of suction cups 310 that use vacuum power to grip the bumper fascia B along its inside surface.

As represented by the arrow 315, the end effector 305 is capable of inward/outward movement. Such movement may be accomplished by use of a linear actuator(s) or by any other motive device known in the art. The inward/outward movement ability allows the end effector 305 to first be moved into the mold cavity and then subsequently extended until the suction cups 310 are in gripping contact with the bumper fascia B. With the bumper fascia B gripped by the suction cups 310, the end effector 305 is retracted, which temporarily draws (deforms) at least the wheel arch portion of the bumper fascia wings inward, as shown. With the bumper fascia held in this deformed position, the wheel arch flange 320 of the molded bumper fascia B will clear the undercut 325 in the mold cavity when the part removal device 300 withdraws the bumper fascia B therefrom (as indicated by the arrow 330). The end effector may return the deformed portions of the bumper fascia B to their normal position while the bumper fascia is in transit, or after the bumper fascia reaches a desired destination.

After the bumper fascia has been removed from the mold cavity by the part removal device 300, the mold may close and another molding cycle may be initiated. The part removal device 300 may deposit the molded bumper fascia to a desired location, as is commonly known in the art.

While certain embodiments of the present invention are described in detail above, the scope of the invention is not to be considered limited by such disclosure, and modifications are possible without departing from the spirit of the invention as evidenced by the following claims:

What is claimed is:

1. A molding system for producing a vehicle bumper fascia having a hidden parting line in a wheel flange area thereof, said system comprising:
    a bumper fascia injection mold, said mold including a core mold half with a primary mold core and a cavity mold half with a part cavity having a wheel arch flange undercut, each mold half adapted for mounting within an injection molding machine, said mold further comprising:
        cooperating pairs of movable secondary cores located on opposite ends of said primary mold core, said secondary core pairs each including an upper core and a lower core,
        a straight lifter connected to said upper core and an angled lifter connected to said lower core of each core pair, and
        an ejector plate coupled to said straight lifters and said angled lifters such that forward movement of said ejector plate will cause a forward movement of said upper secondary cores and a combined forward and inward movement of said lower secondary cores so that a wheel flange portion of a molded bumper fascia will clear said lower secondary mold cores upon mold opening, said bumper fascia remaining in said mold cavity due to said undercut therein; and
    a robotic part removal device including an extendable arm and an end effector coupled to said extendable arm, said end effector adapted to grip a molded bumper fascia while said bumper fascia resides in said mold cavity, to temporarily inwardly deform at least the wheel flange portions of the bumper fascia, and to retain the bumper fascia in such a deformed position at least until said wheel flange portions thereof clear said undercut in said mold cavity during removal by said robotic part removal device.

2. The molding system of claim 1, wherein said undercut in said mold cavity cooperates with a cavity in an outboard portion of said mold core to produce said wheel flange portion of said bumper fascia.

3. The molding system of claim 1, wherein inner faces of said secondary cores mate with corresponding faces on said primary mold core.

4. The molding system of claim 3, wherein said mating faces are angled inward toward the centerline of said mold to facilitate separation of said secondary cores from said primary core.

5. The molding system of claim 3, wherein said lower secondary cores are slidably coupled to said primary core to help guide the movement of said lower secondary cores.

6. The molding system of claim 1, wherein a bottom surface of said upper secondary cores rests on an upper surface of said lower secondary cores when said secondary cores are retracted.

7. The molding system of claim 1, wherein said end effector of said part removal device includes an actuator that extends and retracts at least portions of said end effector along a lengthwise direction of said bumper fascia.

8. The molding system of claim 1, wherein said end effector is provided with a plurality of vacuum-powered suction cups for gripping an inside surface of a bumper fascia located within said mold cavity.

9. A molding system for producing a vehicle bumper fascia having a hidden parting line in a wheel flange area thereof, said system comprising:
    a bumper fascia injection mold, said mold including a core mold half with a primary mold core and a cavity mold half with a part cavity having a wheel arch flange undercut, each mold half adapted for mounting within an injection molding machine, said mold further comprising:
        sliding secondary cores located on opposite ends of said primary mold core, and
        an actuator located inward of each sliding secondary core within a cavity in said primary mold core, each actuator connected to a corresponding one of said sliding secondary cores and adapted to reciprocate said sliding secondary cores along a linear path within said cavities such that said sliding secondary cores can be retracted prior to mold opening to permit a wheel flange portion of a molded bumper fascia to clear said secondary mold cores upon mold opening, said bumper fascia remaining in said mold cavity due to said undercut therein; and
    a robotic part removal device including an extendable arm and an end effector coupled to said extendable arm, said end effector adapted to grip a molded bumper fascia while said bumper fascia resides in said mold cavity, to temporarily inwardly deform at least the wheel flange portions of the bumper fascia, and to retain the bumper fascia in such a deformed position at least until said wheel flange portions thereof clear said undercut in said mold cavity during removal by said robotic part removal device.

10. The molding system of claim 9, wherein said undercut in said mold cavity cooperates with a cavity in an outboard portion of said mold core to produce said wheel flange portion of said bumper fascia.

11. The molding system of claim 9, wherein a bottom surface of each sliding secondary core is slidably coupled to a mating surface of said primary core to help guide the movement of said sliding secondary cores.

12. The molding system of claim 9, further comprising a slide lock associated with each sliding secondary core, said slide locks adapted to selectively lock said cores in a retracted position and an extended position.

13. The molding system of claim 12, wherein said slide locks are actuatable by an injection molding machine to which said bumper fascia injection mold is installed.

14. The molding system of claim 9, wherein said end effector of said part removal device includes an actuator that extends and retracts at least portions of said end effector along a lengthwise direction of said bumper fascia.

15. The molding system of claim 9, wherein said end effector is provided with a plurality of vacuum-powered suction cups for gripping an inside surface of a bumper fascia located within said mold cavity.

16. A method of producing a vehicle bumper fascia having a hidden parting line in a wheel flange area thereof, said method comprising:
providing a bumper fascia injection mold, said mold including a core mold half with a primary mold core and a cavity mold half with a part cavity having a wheel arch flange undercut, each mold half adapted for mounting within an injection molding machine, said mold further comprising:
cooperating pairs of movable secondary cores located on opposite ends of said primary mold core, said secondary core pairs each including an upper core and a lower core,
a straight lifter connected to said upper core and an angled lifter connected to said lower core of each core pair, and
an ejector plate coupled to said straight lifters and said angled lifters such that forward movement of said ejector plate will cause a forward movement of said upper secondary cores and a combined forward and inward movement of said lower secondary cores so that a wheel flange portion of a molded bumper fascia will clear said lower secondary mold cores upon mold opening, said bumper fascia remaining in said mold cavity due to said undercut therein; and
providing a robotic part removal device including an extendable arm and an end effector coupled to said extendable arm, said end effector adapted to grip a molded bumper fascia while said bumper fascia resides in said mold cavity after molding;
using said robotic part removal device to temporarily inwardly deform the wheel flange portions of the bumper fascia by an amount that will permit said wheel flange portions to clear said undercut in said mold cavity upon removal of said bumper fascia therefrom;
using said robotic part removal device to remove said bumper fascia from said mold cavity; and
returning said wheel flange portions of the bumper fascia to a substantially non-deformed position.

17. The method of claim 16, wherein said undercut in said mold cavity cooperates with a cavity in an outboard portion of said mold core to produce said wheel flange portion of said bumper fascia.

18. The method of claim 16, wherein inner faces of said secondary cores mate with corresponding faces on said primary mold core.

19. The method of claim 18, wherein said mating faces are angled inward toward the centerline of said mold to facilitate separation of said secondary cores from said primary core.

20. The method of claim 18, wherein said lower secondary cores are slidably coupled to said primary core to help guide the movement of said lower secondary cores.

21. The method of claim 16, wherein said end effector uses vacuum-powered suction cups to grip an inside surface of a bumper fascia located within said mold cavity.

22. A method for producing a vehicle bumper fascia having a hidden parting line in a wheel flange area thereof, said system comprising:
providing a bumper fascia injection mold, said mold including a core mold half with a primary mold core and a cavity mold half with a part cavity having a wheel arch flange undercut, each mold half adapted for mounting within an injection molding machine, said mold further comprising:
sliding secondary cores located on opposite ends of said primary mold core, and
an actuator located inward of each sliding secondary core within a cavity in said primary mold core, each actuator connected to a corresponding one of said sliding secondary cores and adapted to reciprocate said sliding secondary cores along a linear path within said cavities such that said sliding secondary cores can be retracted prior to mold opening to permit a wheel flange portion of a molded bumper fascia to clear said secondary mold cores upon mold opening, said bumper fascia remaining in said mold cavity due to said undercut therein;
providing a robotic part removal device including an extendable arm and an end effector coupled to said extendable arm, said end effector adapted to grip a molded bumper fascia while said bumper fascia resides in said mold cavity after molding;
using said robotic part removal device to temporarily inwardly deform the wheel flange portions of the bumper fascia by an amount that will permit said wheel flange portions to clear said undercut in said mold cavity upon removal of said bumper fascia therefrom;
using said robotic part removal device to remove said bumper fascia from said mold cavity; and
returning said wheel flange portions of the bumper fascia to a substantially non-deformed position.

23. The method of claim 22, wherein said undercut in said mold cavity cooperates with a cavity in an outboard portion of said mold core to produce said wheel flange portion of said bumper fascia.

24. The method of claim 22, wherein a bottom surface of each sliding secondary core is slidably coupled to a mating surface of said primary core to help guide the movement of said sliding secondary cores.

25. The method of claim 22, further comprising providing a slide lock on each sliding secondary core, said slide locks adapted to selectively lock said cores in a retracted position and an extended position.

26. The method of claim 25, wherein said slide locks are actuated by an injection molding machine to which said bumper fascia injection mold is installed.

27. The method of claim 22, wherein said end effector uses a plurality of vacuum-powered suction cups to grip an inside surface of a bumper fascia located within said mold cavity.

* * * * *